(12) United States Patent
Wagner

(10) Patent No.: US 6,331,826 B1
(45) Date of Patent: Dec. 18, 2001

(54) METHOD FOR PROVIDING AN IMPROVED RUN-LENGTH ENCODING ALGORITHM FOR DATA COMPRESSION

(75) Inventor: Marcus Wagner, Santa Monica, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,289

(22) Filed: Jan. 4, 2000

(51) Int. Cl.[7] ....................................... H03M 7/00
(52) U.S. Cl. .................................. 341/59; 341/51
(58) Field of Search .................. 341/59, 63, 61, 341/50, 95, 51, 55, 87, 143; 375/122

(56) References Cited

U.S. PATENT DOCUMENTS 4,799,242 * 1/1989 Vermeulen ........................... 375/122
5,717,394 * 2/1998 Schwartz et al. ...................... 341/51
6,166,664 * 12/2000 Acharya ................................ 341/63

* cited by examiner

*Primary Examiner*—Brian Young
*Assistant Examiner*—John B Nguyen

(57) ABSTRACT

The present invention provides an improved method for encoding a plurality of bit sequences. The present invention includes reading a bit sequence; determining a minimum number of bits for a repeat factor for the bit sequence, where the minimum number of bits is variable; and encoding the bit sequence using the repeat factor. The method provides an improved run-length encoding algorithm by using a strategy where the number of bits used to represent the repeat factor (RF) varies for each individual sequence of equal-valued bits. Rather than conventionally representing the RF by any predetermined and fixed number of bits, the RF of the present invention is represented by the minimum number of bits to binary-encode that repeat factor as an unsigned integer. The RF for each individual bit sequence is represented using only the minimum number of bits necessary, regardless of any previous or following RF.

20 Claims, 6 Drawing Sheets

METHOD FOR PROVIDING AN IMPROVED RUN-LENGTH ENCODING ALGORITHM FOR DATA COMPRESSION

FIELD OF THE INVENTION

The present invention relates to data compression, and more particularly to run-length encoding data compression.

BACKGROUND OF THE INVENTION

Data compression is important in the area of data transmission and storage. One family of algorithms for data compression is the run-length encoding algorithms. Run-length encoding algorithms are frequently the method of choice for data compression when data predominantly consists of sequences of equal-valued bits, such as visual images, because of the high compression ratios they can attain.

In this family of data compression algorithms, often, an alphabet of symbols is defined, where such a symbol can consist of one or more bits. Then the data compression is achieved by representing the data as pairs of a symbol and its repeat factor, i.e., its successive occurrence. In the case where the alphabet consists only of two bit values, such as 0 and 1, an alphabet need not be defined because successive repeat factors, commonly also referred to as, run-lengths, can designate the length of sequences of alternating bit values: one repeat factor is the number of 0-valued bits and the next repeat factor is the number of 1 -values bits. If one bit value predominantly occurs with a repeat factor of one, then only the repeat factor of the opposite bit value which occurs with varying repeat factors may be written. This implies that between any two such repeat factors, there is a single bit of the opposite bit value.

A problem that limits the efficiency of run-length encoding algorithms is that the repeat factors themselves occupy a certain number of bits, and it can be difficult or impossible to determine the optimal number of bits to represent these repeat factors, especially without knowing the actual data to compress. To aggravate the problem, even if the distribution of repeat factors for the entire data set or bit stream were known before the encoding process is to begin, the best choice of the number of bits to encode the repeat factor need not be constant throughout any one data set or bit stream. In these cases, a sub-optimal data compression ratio most likely results from any fixed choice of the number of bits to encode the repeat factor. Using too many bits to represent the repeat factors is wasteful and contrary to the objective of data compression. Using not enough bits to represent the repeat factors would force the algorithm to introduce zero-length sequences of the opposite bit-value, or other measures for the same purpose, and to then encode the remainder of the sequence that was too long to represent, in the same fashion.

One example of the problem above occurs in a multicast satellite system. FIG. 1 illustrates such a conventional satellite system 100 which may use data compression algorithms. The system includes a central site 102, at which is a transponder 110 and a server 112. The central site 102 communicates with remote clients 104 via a satellite 108. Receivers 106 at the client sites facilitate this communication. To ensure the correct delivery of data over the satellite 108 to remote clients 104, the multicast application server 112 must be able to determine if the data was received correctly by all addressed clients, and the server 112 must resend the incorrectly received data. Therefore, the clients 104 must respond to the server 112, indicating which of the data need to be resent, either because they were missed altogether, or because they contain more transmission errors than what can be reconstructed. The response from each client can be different from that of any other client, and the amount of back traffic from all clients 104 to the server 112 will scale approximately linearly with the number of receivers. This client response data traffic, or back traffic, is a serious burden not only for the central site server 112, but also for the server's local network which may not have sufficient bandwidth and/or responsiveness to handle this client response traffic without impacting other duties of that network. In the case where the server 112 sends the payload data by satellite 108 while the clients 104 respond over a much slower terrestrial network, this client response traffic may be the single most serious limiting factor to increasing the number of clients. Thus, the flooding of a multicast sender/server 112 by the responses from its clients 104, called client response implosion, is a common and significant impediment to the runtime performance and to the scalability in the number of receivers and of multicast and broadcast applications. The possibility of client response implosion is aggravated when transmission errors increase due to adverse weather conditions, obscuring of the line of transmission, or sun spot activity. The efficiency of the run-length encoding algorithm used in data compression by the network is therefore a critical factor.

Accordingly, there exists a need for a method for providing an improved run-length encoding algorithm for data compression. The present invention addresses such a need.

SUMMARY OF THE INVENTION

The present invention provides an improved method for encoding a plurality of bit sequences. The present invention includes reading a bit sequence; determining a minimum number of bits for a repeat factor for the bit sequence, where the minimum number of bits is variable; and encoding the bit sequence using the repeat factor. The method provides an improved run-length encoding algorithm by using a strategy where the number of bits used to represent the repeat factor (RF) varies for each individual sequence of equal-valued bits. Rather than conventionally representing the RF by any predetermined and fixed number of bits, the RF of the present invention is represented by the minimum number of bits to binary-encode that repeat factor as an unsigned integer. The key advantage of providing the variable width RF run-length encoding algorithm is that the RF for each individual bit sequence is represented using only the minimum number of bits necessary, regardless of any previous or following RF. Consequently, a compression ratio can be obtained, which is higher than that obtained with the conventional algorithms, over a wide range of sequence length distributions in the data to compress. Additionally, the variable width RF is data driven in that the data to compress is what controls how many bits are used to represent the RF. Therefore, it is unnecessary to know the bit value sequence distribution in advance, which makes the method in accordance with the present invention well suited for real-time application.

DETAILED DESCRIPTION

The present invention provides a method for providing an improved run-length encoding algorithm for data compression. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides an improved run-length encoding algorithm by using a strategy where the number of bits used to represent the repeat factor (RF) varies for each individual sequence of equal-valued bits. The RF is the number of successive repetitions of the same bit value in a bit sequence to compress. Rather than conventionally representing the RF by any predetermined and fixed number of bits, the RF of the present invention is represented by the minimum number of bits to binary-encode that repeat factor as an unsigned integer.

In the preferred embodiment, the number of bits needed to represent the RF of a sequence of equal-valued bits is written to the output bit stream (OBS) before the actual RF, using a small parameterized number of bits, called the repeat factor encoding width (RFEW). The first item of information constituting a bit sequence compressed with the method in accordance with the present invention is the RFEW. The actual RF is then represented using repeat factor width (RFW) bits. For example, if the RFEW is 4 bits, then the RFW can range from 1 to 16 bits. The RFW can never be smaller than 1 bit, since even a RF of zero needs one bit to be represented. For an RFW of 1 to 16 bits, a RF can attain values ranging from zero to $2^{16}-1$, or 65,635.

To more particularly describe the features of the present invention, please refer to FIGS. 2 through 7 in conjunction with the discussion below.

Figure 2:
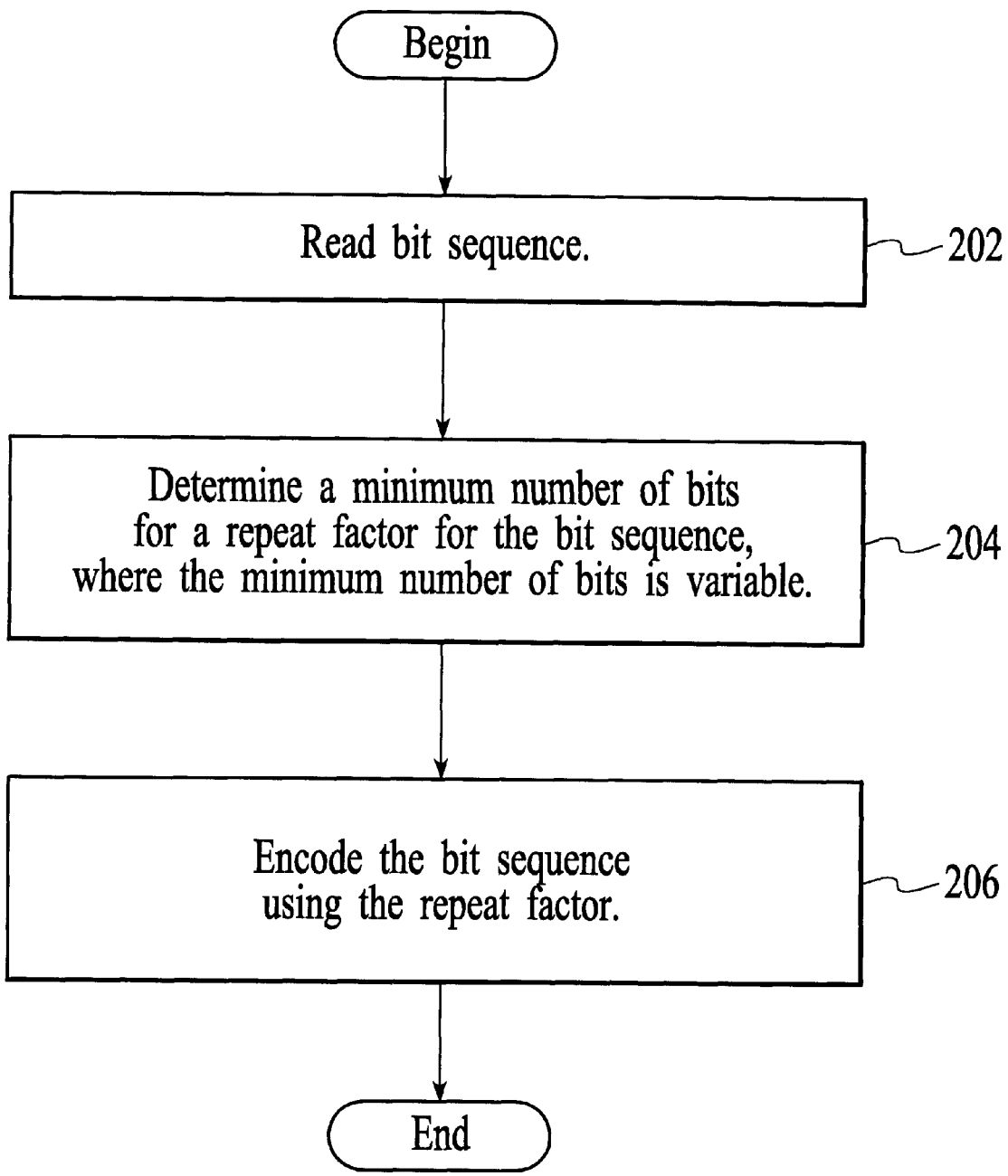
FIG. 2 is a flow chart illustrating a preferred embodiment of a method for providing an improved run-length encoding algorithm for data compression in accordance with the present invention.

FIG. 2 is a flow chart illustrating a preferred embodiment of a method for providing an improved run-length encoding algorithm for data compression in accordance with the present invention. First, a bit sequence to encode is read, via step 202. Next, a minimum number of bits for a RF for the bit sequence is determined, where the minimum number of bits is variable, via step 204. Then, the bit sequence is encoded using the RF, via step 206.

For example, assume that a bit sequence for one thousand consecutive "1"'s is to be encoded. The RP for this bit sequence is thus one thousand as well. The binary representation of the RF is "1111101000", which occupies ten bits. The RF width would be ten, which is "1010" in binary. However, no RF can occupy less than one bit, because even a RF of zero requires one bit to encode that zero. Therefore, one is always implicitly added to the RF width, which is encoded in the first RFEW bits of an encoded bit sequence. Consequently, in this example, the RF of one thousand, with the resulting binary RF width of ten bits, the first four bits of the encoded sequence will contain the value of nine, or "1001" in binary. Following these initial RFEW bits are the ten bits that encode the RE of one thousand. Thus, the bit sequence of one thousand consecutive equal bits is encoded into a fourteen bit long output sequence, "10011111101000", where the first bits, "1001" is the RFEW. The resulting compression ratio is 1000/14, or 71.4. Although this example illustrates a RFEW of four bits, any number of bits may be used.

Figure 3:
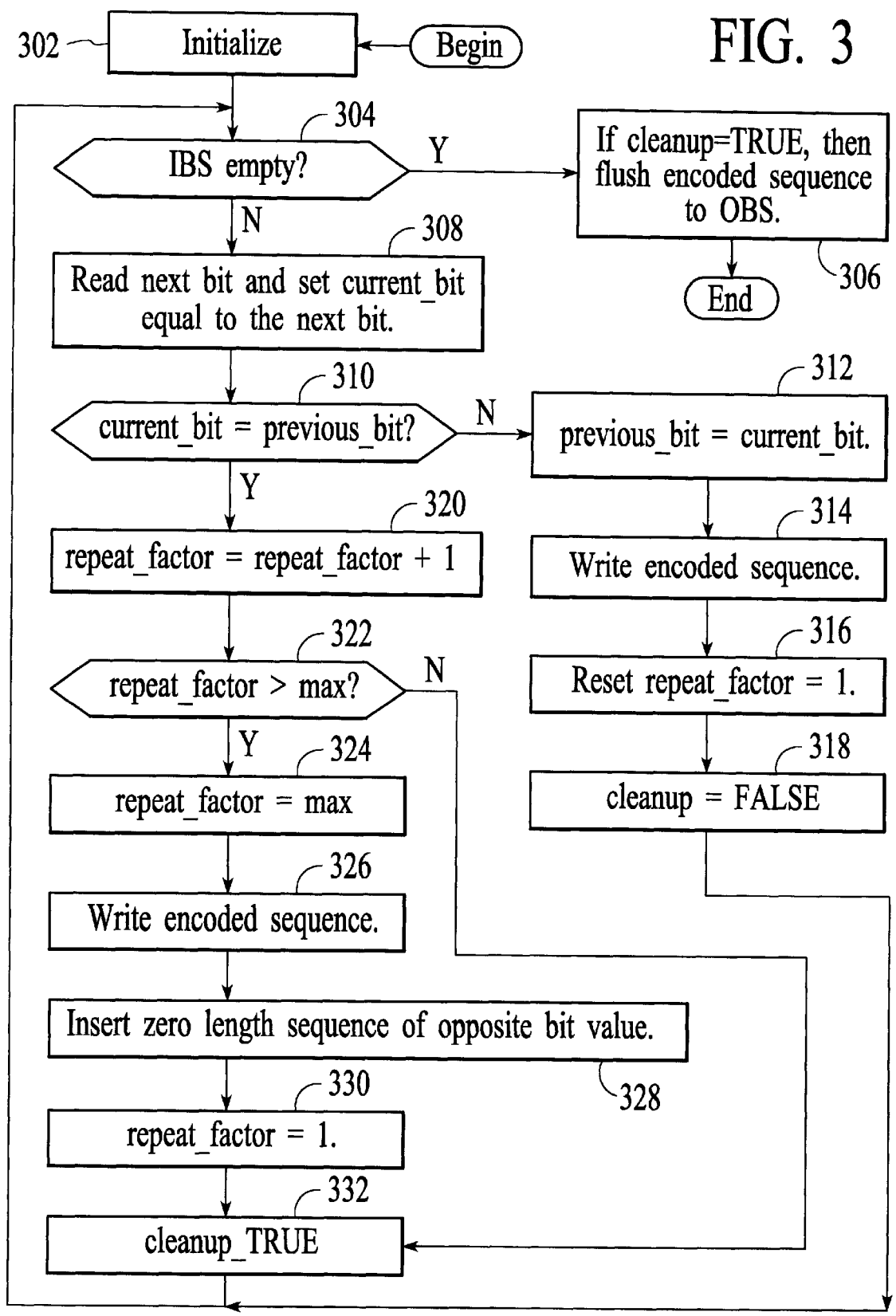
FIG. 3 is a flow chart illustrating in more detail the preferred embodiment of the method for providing an improved run-length encoding algorithm for data compression in accordance with the present invention.
Figure 4:
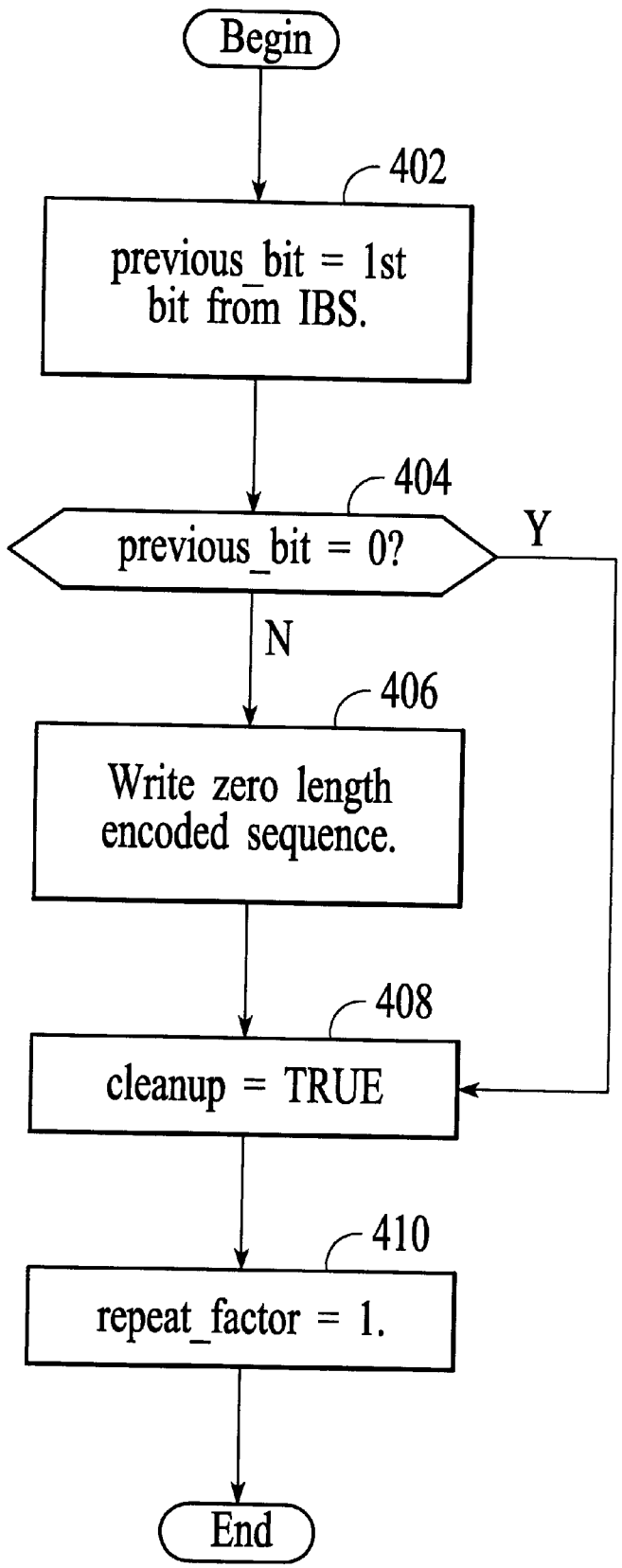
FIG. 4 is a flow chart illustrating in more detail the initializing step in accordance with the present invention.

FIG. 3 is a flow chart illustrating in more detail the preferred embodiment of the method for providing an improved run-length encoding algorithm for data compression in accordance with the present invention. First, the process is initialized, via step 302. FIG. 4 is a flow chart illustrating in more detail the initializing step 302. In the initialization, the first bit from the input bit stream (IBS) is read, and the global variable "previous_bit" is set equal to the first bit, via step 402. If previous_bit is determined to not be equal to zero, via step 404, then a zero length encoded sequence is written, via step 406. The global variable "cleanup" is set equal to "TRUE", via step 408, and the global variable for the RF, "repeat_factor", is set equal to one, via step 410. The variable "cleanup" indicates whether or not an encoded sequence is to be flushed to the OBS. If previous_bit is determined to be equal to zero, via step 404, then the initializing step skips step 406 and proceeds to step 408 and 410. However, whether the convention requires the first bit of the OBS to be zero, as is used above, or one, is arbitrary. The predominant bit value of the IBS should be used.

Figure 5:
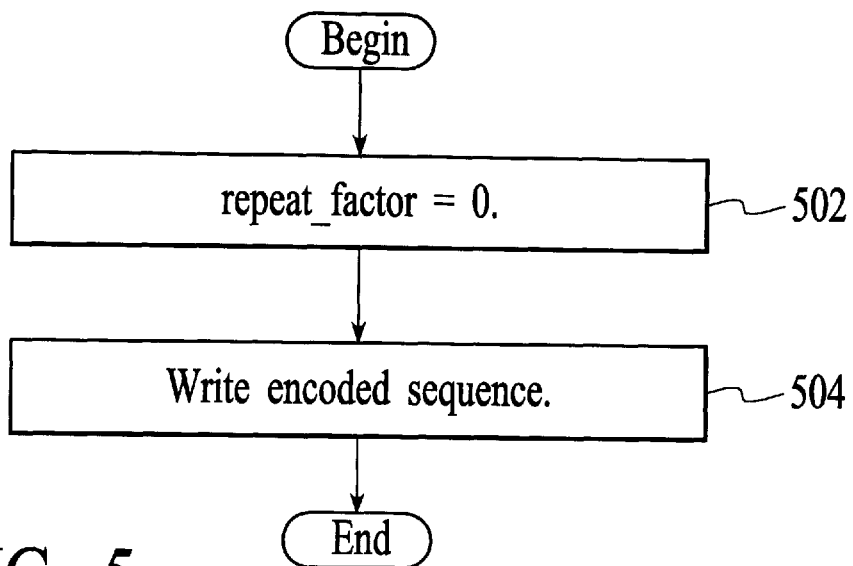
FIG. 5 is a flow chart illustrating in more detail the writing the zero length sequence in accordance with the present invention.

FIG. 5 is a flow chart illustrating in more detail the writing the zero length sequence (step 406, FIG. 4) in accordance with the present invention. First, the repeat_factor is set equal to zero, via step 502. Then, the encoded sequence is written, via step 504.

Returning to FIG. 3, once the encoding process is initialized via step 302, it is determined if the IBS is empty, via step 304. If so, then if cleanup equals TRUE, then the encoded sequence is flushed to the OBS, via step 306. If not, then the next bit of the IBS is read and the global variable "current_bit" is set equal to the next bit, via step 308. Then, it is determined if current_bit equals previous_bit, via step 310. If not, then the end of a sequence of equal bits has been reached and current_bit is the first bit of the next bit sequence. Previous_bit is then set equal to current_bit to track the bit value of the next bit sequence, via step 312. The encoded sequence is then written, via step 314. The RF is reset equal to one, via step 316, and cleanup is set to FALSE, via step 318, since the old sequence has already been flushed to the OBS. The process then loops back to step 304.

If current_bit is equal to previous_bit, via step 310, then the value of repeat_factor is incremented by one, via step 320, in order to count the number of sequential equal bits. If the incremented repeat_factor has exceeded a preset maximum value, via step 322, then repeat_factor is set equal to the maximum value, via step 324. (This maximum value is $2^{(2^{RFEW})}-1$). Then, the encoded sequence is written, via step 326, and a zero length sequence of the opposite bit value is inserted after the encoded sequence, via step 328. The repeat_factor is then reset equal to one, via step 320, and cleanup is set to TRUE, via step 332. The process then loops back to step 304.

Figure 6:
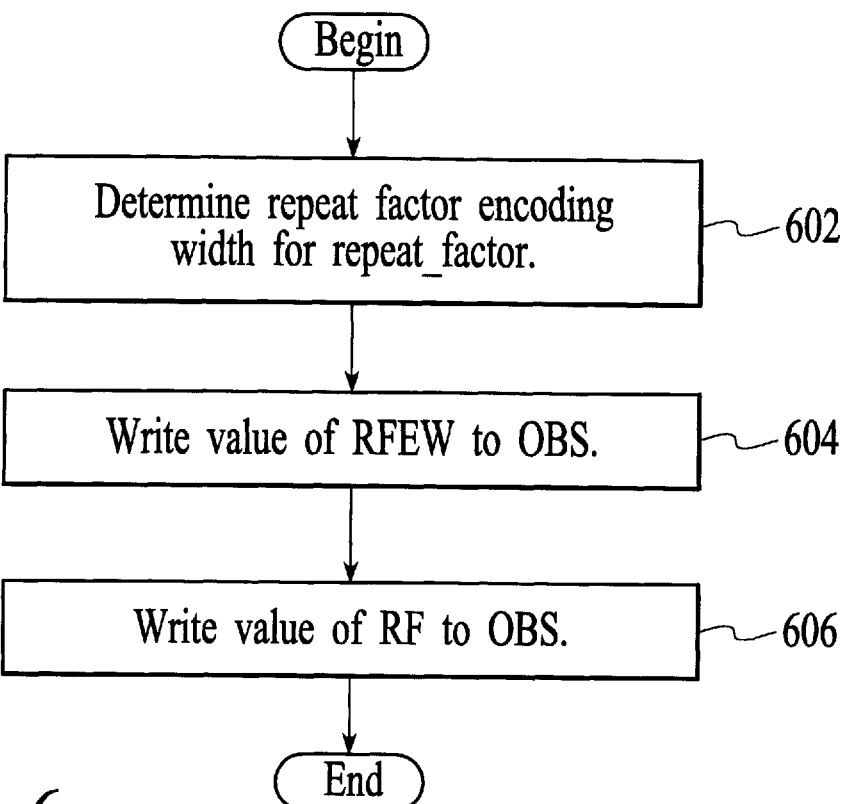
FIG. 6 is a flow chart illustrating in more detail the writing of the encoded sequence in accordance with the present invention.

FIG. 6 is a flow chart illustrating in more detail the writing of the encoded sequence (steps 326 and 314, FIG. 3; step 504, FIG. 5) in accordance with the present invention. First, the RFEW for the value of repeat_factor is determined, via step 602. Next, the value of the RFEW is written to the OBS, via step 604. Then, the value of repeat_factor is written to the OBS, via step 606.

Figure 7:
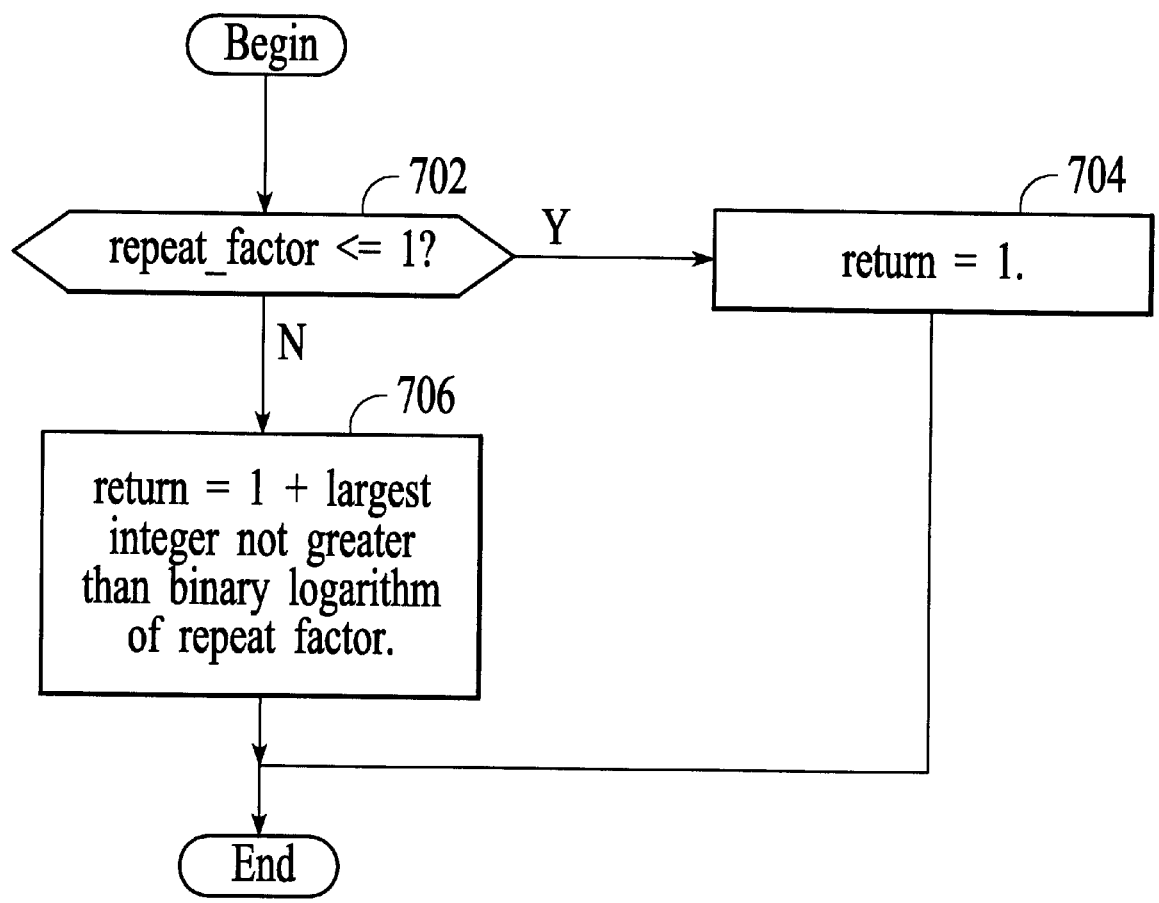
FIG. 7 is a flow chart illustrating in more detail the determining of the RFEW in accordance with the present invention.

FIG. 7 is a flow chart illustrating in more detail the determining of the RFEW (step 602, FIG. 6) in accordance with the present invention. First, it is determined if repeat_factor is less than or equal to one, via step 702. If it is, then a one is returned for the RFEW, via step 704. If not, then a RFEW equal to one plus the largest integer not greater than the binary logarithm of repeat_factor is returned, via step 706.

The key advantage of providing the variable width RF run-length encoding algorithm in accordance with the present invention is that the RF for each individual bit sequence is represented using only the minimum number of bits necessary, regardless of any previous or following RF. Consequently, a compression ratio can be obtained, which is higher than that obtained with the conventional algorithms, over a wide range of sequence length distributions in the data to compress. Additionally, the variable width RF is data driven in that the data to compress is what controls how many bits are used to represent the RF. Therefore, it is unnecessary to know the bit value sequence distribution in advance, which makes the method in accordance with the present invention well suited for real-time application.

To demonstrate the higher compression ratio obtained by the method in accordance with the present invention, assume that there are bit sequences of 1000 "0"'s, 20"1"'s, and 300 "0"'s to be encoded, as illustrated in the table below.

TABLE 1

| Uncompressed bit sequence | Bits after compression with Conventional method with RF fixed width of 4 bits | Bits after compression with method in accordance with present invention with variable width RF |
|---|---|---|
| 1000 × "0" | 532 | 14 |
| 20 × "1" | 12 | 9 |
| 300 × "0" | 156 | 13 |
| TOTAL 1320 | 700 | 36 |

Using a conventional run-length compression algorithm with a RF fixed with of 4 bits, the sequence of 1000 consecutive "0"'s require 67 RF and 66 sequences for the opposing value in between each RF, requiring 532 bits. For the sequence of 20 consecutive "1"'s, 2 RF's are required plus 1 for the opposing value in between the RF's, requiring 12 bits. For the sequence of 300 consecutive "0"'s, 20 RF's are required plus 19 for the opposing value in between each RF, requiring 156 bits. Thus, with the conventional run-length compression algorithm, a total of 700 bits is required to encode the bit sequences. The compression ratio is 1320/700=1.89.

In contrast, with the method in accordance with the present invention, the sequence of 1000 consecutive "0"'s require one RF with a width of 10 bits; the sequence of 20 consecutive "1"'s require one RF with a width of 5 bits; and the sequence of 300 consecutive "0"'s require one RF with a width of 9 bits. A RFEW with 4 bits is needed for each RF, resulting in 14 bits to encode the 1000 "0"'s, 9 bits to encode the 20 "1"'s, and 13 bits to encode the 300"0"'s. Thus, with the run-length compression algorithm in accordance with the present invention, which uses a variable RF width, a total of 36 bits is required to encode the bit sequences. The compression ratio is 1320/36=36.7. Therefore, a higher compression ratio is accomplished, which significantly exceeds that accomplished by the conventional run-length encoding algorithm.

Figure 1:
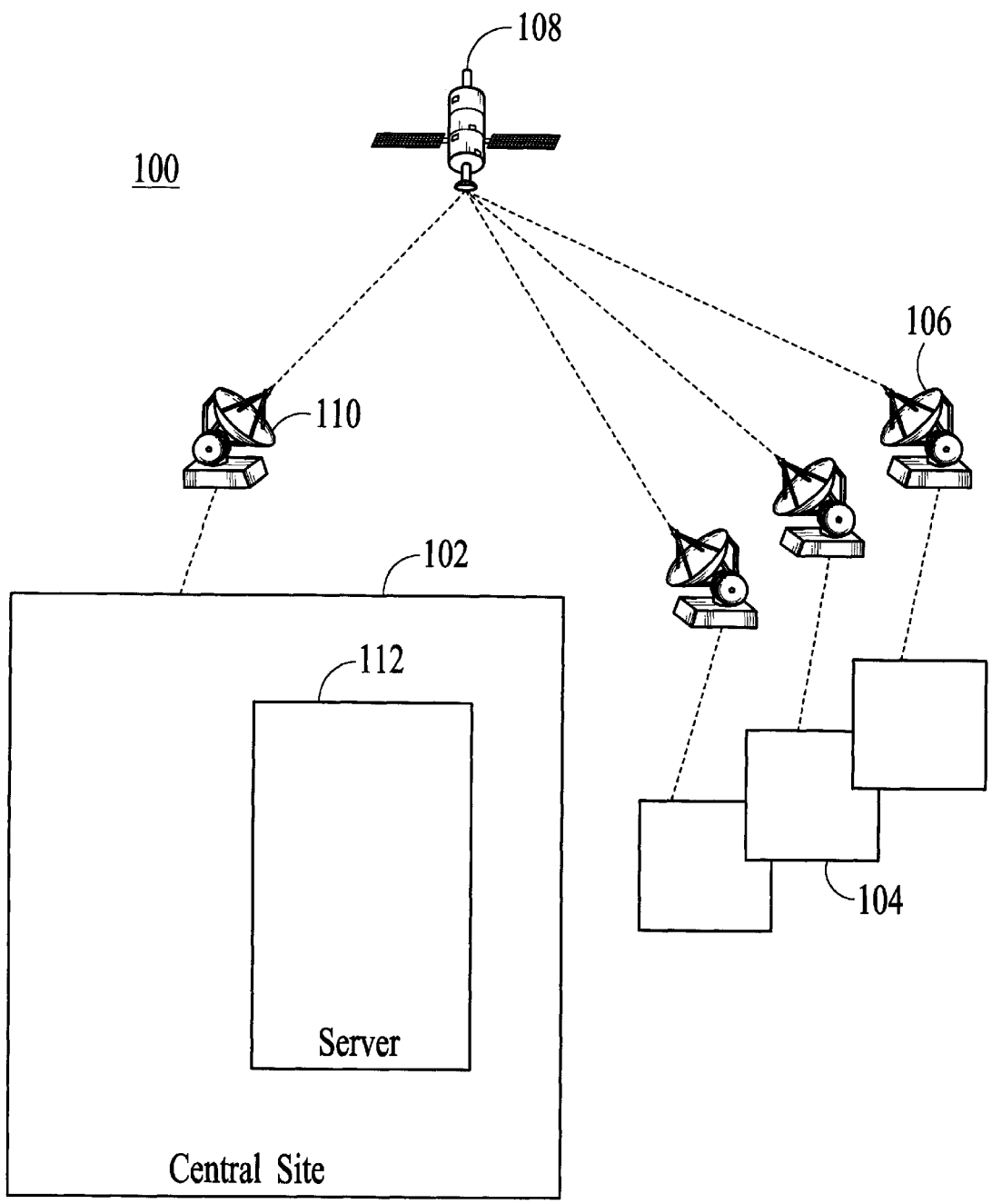
FIG. 1 illustrates a conventional satellite system which may use data compression algorithms.

In the context of the satellite network illustrated in FIG. 1, several advantages are obtained with the method in accordance with the present invention. Since a higher compression ratio is possible, the data load on the local network environment of the server 112 is much lighter than without using the algorithm of the present invention. This has two consequences. First, it may make some customer installations feasible because the customer's existing or planned data network could not otherwise tolerate the additional burden imposed by the uncompressed back traffic from multicast applications. Second, the reduction of the work load of the server's local network may now allow the upgrade of the existing or planned system to a much larger total number of clients. Also, having to process significantly less data in the back traffic, the server 112 is less likely to be overrun by the client responses.

The decompression of the algorithm in accordance with the present invention does not require a sophisticated algorithm. Since sustained data traffic from memory to the processor (not shown) of the server 112 can be a major performance bottleneck of that server when processing client back traffic, data compression in accordance with the present invention can improve the overall speed at which the server 112 can process the client responses. This is because less response data per client has to be piped into the processor as compared to using conventional compression methods. This, in turn, improves the overall throughput of the server 112 which now has some of its resources freed. The implementation of the algorithm in accordance with the present invention requires very little resources in terms of central processing unit (CPU) cycles, and almost none in terms of memory beyond what is needed to contain the executable code implementing it. The data to be compressed have to be read/processed only once, i.e., they can be piped through an implementation of the present invention.

A method for providing an improved run-length encoding algorithm for data compression has been disclosed. The method in accordance with the present invention provides an improved run-length encoding algorithm by using a strategy where the number of bits used to represent the repeat factor (RF) varies for each individual sequence of equal-valued bits. Rather than conventionally representing the RF by any predetermined and fixed number of bits, the RF of the present invention is represented by the minimum number of bits to binary-encode that repeat factor as an unsigned integer. The key advantage of providing the variable width RF run-length encoding algorithm in accordance with the present invention is that the RF for each individual bit sequence is represented using only the minimum number of bits necessary, regardless of any previous or following RF. Consequently, a compression ratio can be obtained, which is higher than that obtained with the conventional algorithms, over a wide range of sequence length distributions in the data to compress. Additionally, the variable width RF is data driven in that the data to compress is what controls how many bits are used to represent the RF. Therefore, it is unnecessary to know the bit value sequence distribution in advance, which makes the method in accordance with the present invention well suited for real-time application.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for encoding a plurality of bit sequences, comprising:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the value for the repeat factor encoding width is a minimum number of bits required for the value of the repeat factor for the bit sequence, wherein the minimum number of bits varies among the plurality of bit sequences; and
   (d) encoding each of the plurality of bit sequences using its repeat factor encoding width and repeat factor.

2. The method of claim 1, wherein the reading step (a) comprises:
   (a1) reading a first bit of the input bit stream;
   (a2) setting a previous bit equal to the first bit;
   (a3) reading a next bit of the input bit stream;
   (a4) setting a current bit equal to the next bit;
   (a5) determining if the previous bit equals the current bit;
   (a6) setting the previous bit equal to the current bit if the previous bit equals the current bit, and return to step (a3); and
   (a7) stopping the reading if the previous bit does not equal the current bit.

3. The method of claim 1, wherein the determining step (b) comprises:
   (b1) setting the value of the repeat factor equal to a predetermined maximum number if the value of the repeat factor is greater than the predetermined maximum number.

4. The method of claim 1, wherein the determining step (c) comprises:
   (c1) setting the value of the repeat factor encoding width equal to one, if the value of the repeat factor is not greater than one; and
   (c2) setting the value of the repeat factor encoding width equal to one plus a largest integer not greater than a binary logarithm of the value of the repeat factor, if the value of the repeat factor is greater than one.

5. The method of claim 1, wherein the encoding step (d) comprises:
   (d1) writing the repeat factor encoding width for each bit sequence to an output bit stream; and
   (d2) writing the repeat factor for each bit sequence to the output bit stream.

6. The method of claim 1, wherein prior to the reading step (a) comprises:
   (a1) initializing the value of the repeat factor equal to one.

7. The method of claim 1, further comprising:
   (e) inserting a zero length sequence for a bit value opposite to a value of the bit sequence.

8. The method of claim 7, wherein the inserting step (e) comprises:
   (e1) setting the value of the repeat factor equal to zero; and
   (e2) encoding the zero length sequence with the value of the repeat factor equal to zero.

9. A computer readable medium with program instructions for encoding a plurality of bit sequences, the instructions for:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the value for the repeat factor encoding width is a minimum number of bits required for the value of the repeat factor for the bit sequence, wherein the minimum number of bits varies among the plurality of bit sequences; and
   (d) encoding each of the plurality of bit sequences using its repeat factor encoding width and repeat factor.

10. The medium of claim 9, wherein the reading instruction (a) comprises instructions for:
    (a1) reading a first bit of the input bit stream;
    (a2) setting a previous bit equal to the first bit;
    (a3) reading a next bit of the input bit stream;
    (a4) setting a current bit equal to the next bit;
    (a5) determining if the previous bit equals the current bit;
    (a6) setting the previous bit equal to the current bit if the previous bit equals the current bit, and return to step (a3); and
    (a7) stopping the reading if the previous bit does not equal the current bit.

11. The medium of claim 9, wherein the determining instructions (b) comprises instructions for:
    (b1) setting the value of the repeat factor equal to a predetermined maximum number if the value of the repeat factor is greater than the predetermined maximum number.

12. The medium of claim 9, wherein the determining instructions (c) comprises instructions for:
    (c1) setting the value of the repeat factor encoding width equal to one, if the value of the repeat factor is not greater than one; and
    (c2) setting the value of the repeat factor encoding width equal to one plus a largest integer not greater than a binary logarithm of the value of the repeat factor, if the value of the repeat factor is greater than one.

13. The medium of claim 9, wherein the encoding instructions (d) comprises instructions for:
    (d1) writing the repeat factor encoding width for each bit sequence to an output bit stream; and
    (d2) writing the repeat factor for each bit sequence to the output bit stream.

14. The medium of claim 9, wherein prior to the reading instruction (a) comprises instructions for:
    (a1) initializing the value of the repeat factor equal to one.

15. The medium of claim 9, further comprising instructions for:

(e) inserting a zero length sequence for a bit value opposite to a value of the bit sequence.

16. The medium of claim 15, wherein the inserting instruction (e) comprises instructions for:
   (e1) setting the value of the repeat factor equal to zero; and
   (e2) encoding the zero length sequence with the value of the repeat factor equal to zero.

17. A method for encoding a plurality of bit sequences, comprising:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the repeats factor encoding width is a minimum number of bits required for the value of the repeat factor for the bit sequence, wherein the minimum number of bits varies among the plurality of bit sequences;
   (d) writing the repeat factor encoding width for each bit sequence to an output bit stream; and
   (e) writing the repeat factor for each bit sequence to the output bit stream.

18. A computer readable medium with program instructions for encoding a plurality of bit sequences, the instructions for:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the repeat factor encoding width is a minimum number of bits required for the value of the repeat factor for the bit sequence, wherein the minimum number of bits varies among the plurality of bit sequences;
   (d) writing the repeat factor encoding width for each bit sequence to an output bit stream; and
   (e) writing the repeat factor for each bit sequence to the output bit stream.

19. A method for encoding a plurality of bit sequences, comprising:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the repeat factor encoding width is a minimum number of bits required for the value of the repeat factor for the bit sequence, comprising:
      (c1) setting a value of the repeat factor encoding width equal to one, if the value of the repeat factor is not greater than one, and
      (c2) setting the value of the repeat factor encoding width equal to one plus a largest integer not greater than a binary logarithm of the value of the repeat factor, if the value of the repeat factor is greater than one;
   (d) writing the repeat factor encoding width for each bit sequence to an output bit stream;
   (e) writing the repeat factor for each bit sequence to the output bit stream; and
   (f) inserting a zero length sequence for a bit value opposite to a value of the plurality of consecutive equal-valued bits.

20. A computer readable medium with program instructions for encoding a plurality of bit sequences, the instructions for:
   (a) reading the plurality of bit sequences, wherein each bit sequence comprises a plurality of consecutive equal-valued bits of an input bit stream;
   (b) determining a value of a repeat factor for each bit sequence, wherein the value of the repeat factor is a number of bits in the bit sequence;
   (c) determining a value for a repeat factor encoding width for each bit sequence, wherein the repeat factor encoding width is a minimum number of bits required for the value of the repeat factor for the bit sequence, comprising:
      (c1) setting a value of the repeat factor encoding width equal to one, if the value of the repeat factor is not greater than one, and
      (c2) set the value of the repeat factor encoding width equal to one plus a largest integer not greater than a binary logarithm of the value of the repeat factor, if the value of the repeat factor is greater than one;
   (d) writing the repeat factor encoding width for each bit sequence to an output bit stream;
   (e) writing the repeat factor for each bit sequence to the output bit stream; and
   (f) inserting a zero length sequence for a bit value opposite to a value of the plurality of consecutive equal-valued bits.

* * * * *

UNITED STATES PATENT AND TRADEMARK OFFICE
CERTIFICATE OF CORRECTION

PATENT NO. : 6,331,826 B1
DATED : December 18, 2001
INVENTOR(S) : Marcus Wagner

Page 1 of 1

It is certified that error appears in the above-identified patent and that said Letters Patent is hereby corrected as shown below:

Column 3,
Line 67, delete "RP" and replace with -- RF --.

Column 4,
Line 12, delete "RE" and replace with -- RF --.

Column 10,
Line 40, delete "set" and replace with -- setting --.

Signed and Sealed this

Fourteenth Day of May, 2002

*Attest:*

JAMES E. ROGAN
*Attesting Officer*     *Director of the United States Patent and Trademark Office*